(12) United States Patent
Korger

(10) Patent No.: US 8,874,809 B2
(45) Date of Patent: Oct. 28, 2014

(54) ASSEMBLY AND A METHOD OF RECEIVING AND STORING DATA WHILE SAVING BANDWIDTH BY CONTROLLING UPDATING OF FILL LEVELS OF QUEUES

(75) Inventor: Peter Korger, Lynge (DK)

(73) Assignee: Napatech A/S, Søborg (DK)

( * ) Notice: Subject to any disclaimer, the term of this patent is extended or adjusted under 35 U.S.C. 154(b) by 0 days.

(21) Appl. No.: 13/513,526

(22) PCT Filed: Dec. 6, 2010

(86) PCT No.: PCT/EP2010/068967
§ 371 (c)(1),
(2), (4) Date: Jul. 16, 2012

(87) PCT Pub. No.: WO2011/067409
PCT Pub. Date: Jun. 9, 2011

(65) Prior Publication Data
US 2012/0278517 A1    Nov. 1, 2012

Related U.S. Application Data

(60) Provisional application No. 61/266,811, filed on Dec. 4, 2009.

(51) Int. Cl.
| | |
|---|---|
| *G06F 3/00* | (2006.01) |
| *G06F 5/00* | (2006.01) |
| *G06F 13/00* | (2006.01) |
| *H04L 12/861* | (2013.01) |

(52) U.S. Cl.
CPC ............ *H04L 49/9047* (2013.01); *H04L 49/90* (2013.01)

USPC ................... 710/53; 710/52; 710/55; 710/57; 711/5; 711/118; 709/232; 709/234

(58) Field of Classification Search
None
See application file for complete search history.

(56) References Cited

U.S. PATENT DOCUMENTS

| | | | | |
|---|---|---|---|---|
| 4,025,903 A | * | 5/1977 | Kaufman et al. | 711/5 |
| 4,330,825 A | * | 5/1982 | Girard | 710/104 |
| 5,548,740 A | * | 8/1996 | Kiyohara | 345/543 |
| 6,141,323 A | * | 10/2000 | Rusu et al. | 370/236 |

(Continued)

FOREIGN PATENT DOCUMENTS

| | | |
|---|---|---|
| WO | 03/071740 | 8/2003 |
| WO | 2009/093299 | 7/2009 |
| WO | 2010/076649 | 7/2010 |

OTHER PUBLICATIONS

Patent Cooperation Treaty, "International Search Report and Written Opinion" by Authorized Officer Jose Perez Perez, from the European Patent Office; mailed May 25, 2011 in PCT/EP2010/068967; pp. 1-8.

(Continued)

*Primary Examiner* — Michael Sun
(74) *Attorney, Agent, or Firm* — McHale & Slavin, P.A.

(57) ABSTRACT

An assembly where a number of receivers receiving packets for storing in queues in a storage and a means for de-queuing data from the storage. A controller determines addresses for the storage, the address being determined on the basis of at least a fill level of the queue(s), where information relating to de-queues addresses is only read-out when the fill-level(s) exceed a limit so as to not spend bandwidth on this information before it is required.

13 Claims, 4 Drawing Sheets

(56) References Cited

U.S. PATENT DOCUMENTS

| | | | |
|---|---|---|---|
| 6,345,350 B2* | 2/2002 | Maruyama et al. | 711/202 |
| 6,430,191 B1 | 8/2002 | Klausmeier | |
| 6,594,234 B1 | 7/2003 | Chard et al. | |
| 6,671,747 B1 | 12/2003 | Benkual et al. | |
| 7,213,094 B2* | 5/2007 | Edirisooriya et al. | 710/310 |
| 7,289,442 B1 | 10/2007 | Srinivasan | |
| 7,680,139 B1 | 3/2010 | Jones | |
| 7,787,370 B1 | 8/2010 | Aweya | |
| 8,356,125 B1* | 1/2013 | Secatch | 710/52 |
| 2001/0003199 A1* | 6/2001 | Maruyama et al. | 711/165 |
| 2002/0169990 A1 | 11/2002 | Sherburne, Jr. | |
| 2003/0056073 A1 | 3/2003 | Zeiger | |
| 2004/0008705 A1 | 1/2004 | Lindsay | |
| 2005/0207423 A1 | 9/2005 | Herbst | |
| 2005/0213582 A1 | 9/2005 | Wakumoto | |
| 2006/0072578 A1 | 4/2006 | Alfano | |
| 2006/0153078 A1* | 7/2006 | Yasui | 370/235 |
| 2006/0221974 A1 | 10/2006 | Hilla et al. | |
| 2006/0268939 A1 | 11/2006 | Dries et al. | |
| 2007/0156975 A1 | 7/2007 | Himpe | |
| 2007/0220193 A1* | 9/2007 | Ikeda et al. | 710/309 |
| 2008/0120480 A1 | 5/2008 | Dryfoos | |
| 2008/0256305 A1* | 10/2008 | Kwon et al. | 711/147 |
| 2008/0288675 A1* | 11/2008 | Kubota | 710/56 |
| 2008/0301398 A1 | 12/2008 | Falik et al. | |
| 2009/0100296 A1 | 4/2009 | Srinivasan et al. | |
| 2010/0281190 A1 | 11/2010 | Namihira | |

OTHER PUBLICATIONS

Pustisek, M., et al., "Architecture-Dependent Packet Switch Performance Under Imbalanced Traffic," Electrotechnical Review, Ljubljana, Slovenija, 72(1); 36-44, 2005.

* cited by examiner

ASSEMBLY AND A METHOD OF RECEIVING AND STORING DATA WHILE SAVING BANDWIDTH BY CONTROLLING UPDATING OF FILL LEVELS OF QUEUES

CROSS-REFERENCE TO RELATED APPLICATIONS

This application is a §371 national stage entry of International Application No. PCT/EP2010/068967, filed Dec. 6, 2010, which claims priority to U.S. Provisional Patent Application No. 61/266,811 filed Dec. 4, 2009, the entire contents of which are incorporated herein by reference.

FIELD OF THE INVENTION

The present invention relates to a manner of receiving/accessing data packets and storing these in a storage in addresses taking into account a fill level of the storage. In particular, the invention relates to a manner of updating the information describing occupied addresses in a storage at a sufficiently slow rate in order to not take up too much bandwidth on a data path along which data to be stored is forwarded.

BACKGROUND

Storing of data and managing the fill levels of storage requires development of new systems and methods of handling the increase in volume and size of modern day data needs.

SUMMARY

An assembly where a number of receivers receiving packets for storing in queues in a storage and a means for de-queuing data from the storage. A controller determines addresses for the storage, the address being determined on the basis of at least a fill level of the queue(s), where information relating to de-queues addresses is only read-out when the fill-level(s) exceed a limit so as to not spend bandwidth on this information before it is required.

Accordingly, in one embodiment, an assembly for receiving and forwarding data packets, comprises: a storage comprising a plurality of addresses at which data may be stored, a data receiving and storing apparatus comprising: means for receiving or accessing a data packet, means for determining an address, and means for facilitating storage of the at least part of the data packet at the determined address in the storage, and means for reading or de-queuing data from the storage, the reading/de-queuing means comprising means for outputting first information relating to one or more address (es) of the storing means, the data of which has been read/de-queued, wherein the determining means are adapted to: derive, on the basis of the address(es) determined, information relating to a fill level of one or more groups of addresses of the storage, instruct, if the fill level exceeds a predetermined level, the reading/de-queuing means to output the first information and re-derive the fill level information also on the basis of the first information.

In another embodiment, a data receiving and storing apparatus is provided for use in the assembly.

In another embodiment, a method of operating the assembly comprises: storing data in a plurality of addresses in the storage, the data receiving and storing apparatus: receiving or accessing a data packet, determining an address, and facilitating storage of the at least part of the data packet at the determined address in the storage, and reading or de-queuing data from the storage, the reading/de-queuing step comprising outputting first information relating to one or more address(es), the data of which has been read/de-queued, a determining step comprising: deriving, on the basis of the address(es) determined, information relating to a fill level of one or more groups of addresses of the storage, instructing, if the fill level exceeds a predetermined level, the reading/de-queuing step to output the first information and re-derive the fill level information also on the basis of the first information.

Other aspects are described infra.

BRIEF DESCRIPTION OF DRAWINGS

In the following, preferred embodiments of the invention will be described with reference to the drawing, wherein.

DETAILED DESCRIPTION

Figure 1:
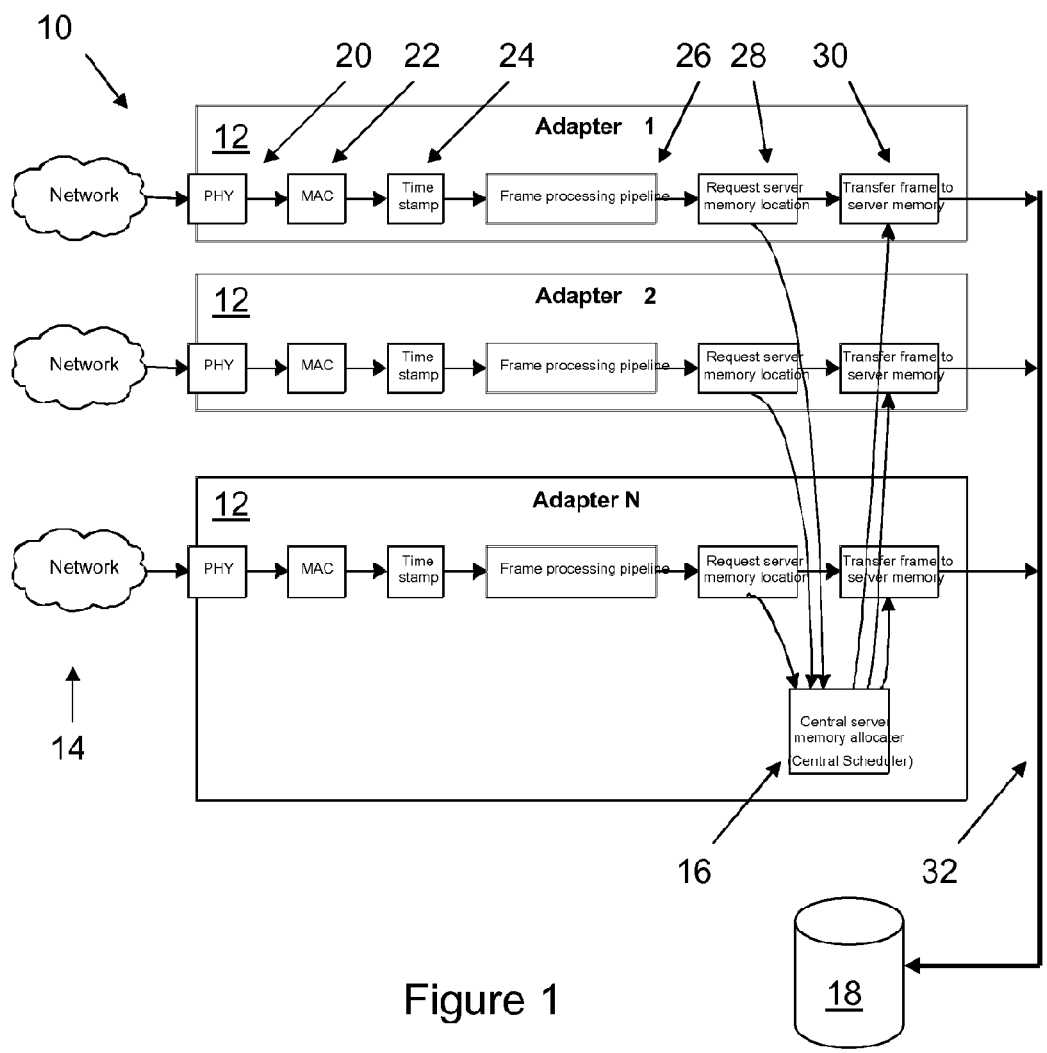
FIG. 1 illustrates a first embodiment according to the invention.

In a first aspect, the invention relates to an assembly for receiving and forwarding data packets, the assembly comprising:

a storage comprising a plurality of addresses at which data may be stored,
a data receiving and storing apparatus comprising:
  means for receiving or accessing a data packet,
  means for determining an address, and
  means for facilitating storage of at least part of the data packet at the determined address in the storage, and
means for reading or de-queuing data from the storage, the reading/de-queuing means comprising means for outputting first information relating to one or more address (es) of the storing means, the data of which has been read/de-queued,
wherein the determining means are adapted to:
  derive, on the basis of the address(es) determined, information relating to a fill level of one or more groups of addresses of the storage,
  instruct, if the fill level exceeds a predetermined level, the reading/de-queuing means to output the first information and re-derive the fill level information also on the basis of the first information.

In the present context, the assembly and/or the reading/de-queuing means and/or the receiving/storing apparatus may be a single piece of hardware within a single housing or may be formed by a number of separate elements, such as the storing unit and/or the controlling unit separate from the receiving/storing units, but detachably interconnected so as to be able to exchange data. In the last situation, the assembly may be quite flexible in that more or fewer receiving/storing units may be added to suit the needs or requirements. This exchange may be under any data transfer protocol, such as TCP, Ethernet, Bluetooth or the like, and using any type of data transfer, wired or wireless.

A data packet may be any type of a data unit to be transmitted on or transported by a network, data cable, data bus, trunk, or the like. Normally, a data unit conforms to one or more data standards, such as the Ethernet standard being an umbrella under which a number of different standards or data packet types exist, such as UDP and TCP data packets. A data packet usually has a number of different information items or types, such as address data, payload or the like, which are each positioned at well defined or known positions within the data packet. Such positions and types will typically differ from data packet type to data packet type, but usually, the data packet type, and thus the positions of individual contents thereof, may be determined from the actual data packet, where after the individual data items, such as address data and/or payload, may be derived, altered, and/or used in the analysis. The type or standard may be derived directly from the data packet, such as when a particular data item of the packet identifies the type/standard, or may be derived from data derived from the data packet, such as on the basis of recognition of types and positions of data items of the data packet and subsequently determination of type(s) or standard (s) of data packet in which such data may be found at such position(s).

Any part of a data packet may be stored. If the data packet is not desired output again, addressing information therein, e.g., may be deleted in order to not take up space.

Data packets may be ordered and, if so, in a multiple of manners and for a number of reasons. Usually, data exchange between computers is a file transfer, TCP transfer, VoIP or the like, where the order of the individual packets is important. Usually, such transfers are called streams.

A stream of data packets normally is a sequence of data packets transmitted from a single transmitter to one or more receivers. These data packets relate to e.g. a single file or the like transmitted in smaller portions, being the payload of the packets. The transmitter and receiver, or any intermediate network elements, will usually then have addresses also represented in the packet. In addition, other stream identifying information may be present in the data packet, depending on the individual data packet standard.

Thus, a stream may be identified on the basis of e.g. the addresses and/or the stream identifying information, whereby, if used consistently, the same information may be derived, and any subsequent process may identify the stream merely from the information. In another situation, data packets may be provided with information therein determining the order thereof, such as a sequence number or a time stamp. Thus, this information may be used for ordering the packets, such as when stored in the storage.

The storage preferably comprises a number of queues each comprising a number of addresses and/or a number of storing units each defined by an address. Usually, a storage has separately addressable elements, and a number of such elements may form a queue.

Data packets may have different sizes and may then take up a varying number of addresses.

Naturally, the storage may be any form of storing unit, such as a monolithic storing unit or one composed by a number of storing elements separated in space. Usual storing technologies are based on hard drives, floppy discs, RAM, ROM, PROM, EPROM, EEPROM, Flash, memory cards, CD-ROM, DVD, memory cards, or the like.

If separate storing units are provided, the address will describe both the identity of the actual storing unit and the "local address" therein.

The fill level may be an overall fill level for the storage or a fill level for defined groups of queues may be determined, or the fill level for each individual group of addresses. Naturally, different groups/queues may have different fill levels. A fill level may be any percentage, such as 5%, 10%, 15%, 20% or more, or a total number of addresses or addressable elements, such as 1000, 10,000 or more, a number of addressable elements able to store a number of jumbo packets, or a total amount of data, such as 1 kB, 1 MB or the like.

The accessing/receiving means may actually receive and/or store the data or data packet. Alternatively, the data packet may be received or stored at another position or in an apparatus with which the receiving/storing apparatus communicates, whereby the data of the data packet is accessed remotely by reading the data while being stored in the other apparatus. The latter will usually provide a slower processing, as the data packet is accessed remotely.

Even though it is less preferred, the address received may not be the actual address in the storing unit at which the data packet is to be stored. Alternatively, information may be received from which this address may be derived.

Preferably, the storing of data packets in the storage is performed by DMA, which is the fastest manner of storing data in a storing unit.

The facilitating means may store the at least part of the data packet directly in the storage, such as over a data connection or it may facilitate storing of the data packet if stored at another location. Then, the address may be transferred to this other location, which then handles the storing of the data packet.

Naturally, the receiving means, the forwarding means and the facilitating means may comprise drivers, connectors etc. required to handle this operation and communicate the data as required.

The determination of the address may be performed in any desired manner, such as on the basis of information derived from the data packet. As described above, data packets may be determined to be part of a stream or of a given type, and the storage thereof may be desired to be according to this information. It may be desired to store data in a particular order or in particular groups or queues, such as for easy or swift reading of certain types of data or streams.

According to the invention, the assembly comprises means for reading or de-queuing data from the storage. These means may be one or more processors or processes.

In this context, a processor or process may be any type of circuit or element adapted to facilitate de-queuing of data and potentially a processing thereof. This processing may be any type of processing, such as surveillance of data traffic, dividing the data packets to different recipients or the like. Also, the processing may be an outputting of the data packets from the assembly and forwarding to subsequent networking elements, such as servers or the like.

The reading/de-queuing means may output the first information only when instructed accordingly and/or e.g. when a maximum period of time has elapsed since the last output. The first information may comprise information relating to all addresses which have been, or which will be, de-queued, such as since the last time first information was output.

In this respect, the first information may be more simple than a large number of addresses. This is in particular the case when the storage comprises a number of queues comprising consecutive addresses. This will be described in detail further below.

When data packets are stored in the storage without receiving the first information, the storage will seem to be filling up with data. Addresses are determined and data added to the storage without data seemingly being read/de-queued.

Thus, when the fill level exceeds a predetermined limit, the fill-level is updated in order to take into account the first information and thus the addresses read/de-queued.

An advantage of only outputting the first information when required is that a bandwidth of data transport to and from the reading/de-queuing means and/or the storage is not used excessively by transmission of the first information. Thus, this bandwidth may be used for storing and/or reading/de-queuing data to/from the storage.

If the updating caused by the limit being reached does not take place within a given maximum period of time, a time out may take place ordering the updating of the first information.

In a preferred embodiment, the determining means are adapted to output second information relating to the determined address, the reading/de-queuing means being adapted to read/de-queue data on the basis of the second information. Then, the second information informs the reading/de-queuing means of addresses to which data has newly been added. Ensuring that the reading/de-queuing means are often or constantly updated with information relating to which addresses are occupied, it may be ensured that the reading/de-queuing means do not become idle. If the reading/de-queuing means were kept uninformed of occupied addresses, the reading/de-queuing means could wrongly be of the understanding that the storage or groups of addresses were empty. Thus, the determining means may output to the reading/de-queuing means, the second information relating to a determined address.

In one embodiment, each of the one or more groups of addresses defines one of a number of queues defined in the storage, each queue being defined by a plurality of sequential/consecutive addresses, all addresses of the queues being non-overlapping, and wherein the determining means are adapted to derive the fill level of the, usually each, queue(s).

In this situation, it is especially preferred when the determining means is adapted to hold, for each queue, a write pointer identifying a next address in which to add data, or a last address to which data was added, and a read pointer identifying a next address to be read/de-queued from the queue, or a last address read/de-queued, the determining means being adapted to update, such as in the second information, the write pointer of the queue to which the determined address relates, when an address is determined, the determining means being adapted to update, on the basis of the first information, the read pointer of the queue from which data has been de-queued, wherein the determining means is adapted to determine the fill level of a queue on the basis of the read and writer pointers of the queue(s).

When the queues are implemented as sequential addresses, the first information output may simply be a pointer or an address. Thus, this new pointer or address will, together with the other end point pointer, provide all required information as to which addresses of the queue are occupied and which are not occupied. The addresses between the two pointers may be those occupied by data. Naturally, the addresses of the queues may be used as a circular list, so that the pointers may wrap around when reaching the end of the group of addresses.

The number of addresses taken up, e.g. an indication of the fill level, may simply be derived by subtracting one pointer from the other.

The updating of the write pointer may require knowledge of a size of the data packet or the part thereof to be stored, as different size data may take up different amounts of space and thus a different number of the addresses.

The updating of the read pointers may be based on a list of all addresses from which data has been read/de-queued or simply the last still-data-containing address or the first free address.

However, the providing of a large number of consecutive addresses may be problematic in real life systems. In standard storage systems, blocks or segments are allocated which have a maximum size of e.g. 4 MB. Within a segment/block, the addresses are consecutive, but as the segments/blocks may be randomly allocated in the memory, the full address may not be.

In such situations, the addresses of the queues of the storage are grouped into groups of predetermined number of physical addresses, the groups being positioned non-consecutively. In this respect, "non-consecutively" means that the groups are not positioned neighboring (having consecutive addresses across group boundaries) in the storage space. Then, the addresses implementing the queues preferably are virtual addresses defined as consecutive addresses, the controlling unit further comprising means for converting between virtual addresses and physical addresses.

Thus, any number of consecutive virtual addresses may be allocated, which are then converted to the real, physical addresses.

One manner of obtaining this is one wherein the storing unit has a number of allocatable segments/blocks, each group of physical addresses defining addresses within one of the allocatable blocks/segments, each block/segment being identifiable with an address of a first number of bits, all addresses within a block/segment being addressable using a second number of bits, the physical addresses having a number of bits corresponding to a sum of the first and second numbers of bits, the virtual addresses each comprising a first part, having at least the first number of bits, and a second part having at least the second number of bits, wherein the converting means are adapted to convert the first part of the virtual address into a third part having the first number of bits and identifying an allocated block/segment, and generating the physical address as an address having the third part and the first part.

In a preferred embodiment, the data receiving and storing apparatus comprises:
  a plurality of data receiving and storing elements each comprising a receiving/accessing means and a storing means, and
  a controlling unit comprising the means for determining the address at which to store at least part of the data packet,
wherein:
  each of the data receiving and storing elements further comprises means for forwarding information relating to the received data packet to the controlling unit,
  the determining means of the controlling unit is adapted to determine the address also on the basis of the forwarded information and the determining means comprises means for returning the address to the pertaining receiving/storing element.

Naturally, the receiving/storing units may be provided as separated pieces of hardware, such as each being embodied by a separate PCB, processor, FPGA or the like. Alternatively, the same PCB/processor/FPGA may form a multiple of the receiving/storing units. The controlling unit may be separate from the receiving/storing units or may form part of one or more thereof.

Naturally, the individual means of the receiving/storing elements may be obtained or shaped as individual elements, such as processors, software controlled or hardwired, FPGAs, special purpose circuits, ASICS or the like. Alternatively, multiple such means may be combined into a single such processor or the like.

Also, any number of receiving/storing elements may be used. When a plurality of receiving/storing elements are used, parallel receipt and storing may be performed. Any number of receiving/storing units may be used, such as 2, 3, 4, 5, 6, 7, 8, 10, 15, 20 or more. All these receiving/storing elements may, as is described further below, be identical or nearly identical, or they may be instantiated or created as different circuits with different operations. Each receiving/storing element may have a controlling unit, but only one is required. In another situation, only one receiving/storing element comprises the controlling unit but is otherwise identical to the remaining receiving/storing elements.

The controlling unit may be formed by any type of processor, hardwired or software controlled, or may be a special purpose circuit. The operation of the controlling unit is to determine the address for the individual data packets. In this manner, an ordering of the data packets may be obtained if desired.

The controlling unit is able to determine a fill level of the queues. In the present context, the fill level may relate to a number of data packets present in a queue or a number of addressable elements taken up by the queue. This fill level may be represented as an amount/number of data/packets/addresses or as a percentage, when this number/amount is compared to a maximum number/amount.

Any type of data communication between the receiving/storing elements and the controlling may be used, such as Ethernet, Bluetooth, or the like, parallel or serial communication, wired or wireless communication.

As described above, the reading/de-queuing means may comprise a plurality of processors or processes. In this situation, a load balancing may be desired, as different processes/processors may have different capabilities or different workloads.

In this situation, preferably each processor or process is adapted to de-queue data from a first group of the queues, the queues of the individual first groups being non-overlapping, and wherein the determining means is adapted to select the address by:
  for a received/accessed data packet, determine a second group of queues, each second group of queues comprising one queue from each first group of queues, the queues of the second groups of queues being non-overlapping,
  if the fill level of a presently selected first queue of the determined second group exceeds a predetermined level, identifying and selecting a second queue of the determined second group,
  selecting the address as an address of the identified, second queue,
the assembly further comprising means for instructing the process/processor relating to the identified and selected second queue to not process this queue, until the first queue with the exceeded predetermined level is empty.

In this embodiment, load balancing between the processes/processors may be obtained while maintaining an ordering in the processing/de-queuing of packets within any second group.

Especially when an ordering of the stored (at least part of) data packets is important when de-queuing and/or analyzing/processing these, it is difficult to allocate such data packets to another reading/de-queuing means, once a reading/de-queuing means has begun de-queuing/processing these. With the present embodiment, each such group of data packets, usually a stream, is allocated to a second group of queues, each second group of queues having separate queues de-queued/processed by separate ones of the reading/de-queuing means. Thus, if the queue in which the data packets are presently stored, and which is de-queued by first reading/de-queuing means, gets too long, i.e. the first reading/de-queuing means is too busy, it is decided to identify another queue, de-queued by a second reading/de-queuing means, from the same second group, but to not allow the second reading/de-queuing means to de-queue data packets, before the first reading/de-queuing means has de-queued all data packets from its queue in the pertaining second group. In this manner, the ordering of de-queuing of the data packets is maintained across reading/de-queuing means.

In a second aspect, the invention relates to a data receiving and storing apparatus for use in the assembly according to the first aspect of the invention. This apparatus may have the above-mentioned means and capabilities.

A third aspect of the invention relates to a method of operating the assembly according to the first aspect, the method comprising:
  storing data in a plurality of addresses in the storage,
  the data receiving and storing apparatus:
    receiving or accessing a data packet,
    determining an address, and
    facilitating, preferably direct, storage of the at least part of the data packet at the determined address in the storage, and
  reading or de-queuing data from the storage, the reading/de-queuing step comprising outputting first information relating to one or more address(es), the data of which has been, or will be, read/de-queued,
a determining step comprising:
  deriving, on the basis of the address(es) determined, information relating to a fill level of one or more groups of addresses of the storage,
  instructing, if the fill level exceeds a predetermined level, the reading/de-queuing step to output the first information and re-derive the fill level information also on the basis of the first information.

Preferably, the first information is not output if not instructed to be so. Then, the first information is only transmitted, when the fill level exceeds the level.

In one embodiment, the determining step comprises outputting second information relating to the determined address, the reading/de-queuing step comprising reading/de-queuing data on the basis of the second information. Contrary to the first information, it is preferred that the second information is often or almost constantly transmitted, such as each time an address is determined, in order to keep the reading/de-queuing means informed of determined addresses.

In one situation, each of the one or more groups of addresses defines one of a number of queues defined in the storing means, each queue being defined by a plurality of sequential addresses, all addresses of the queues being non-overlapping, and wherein the determining step comprises deriving the fill level of, usually each of, the queues.

In this situation, it is especially preferred when the determining step comprises determining, for each queue, a write pointer identifying a next address in which to add data, or a last address to which data was added, and a read pointer identifying a next address to be read/de-queued from the queue, or a last address read/de-queued, the determining step comprising updating the write pointer of the queue to which the determined address relates, when an address is determined, the determining step comprising updating, on the basis of the first information, the read pointer of the queue from which data has been de-queued, wherein the determining comprises determining the fill level of a queue on the basis of the read and writer pointers of the queue(s).

This determination of the fill level may be simple, when the pointers identify the outer limits of the occupied addresses of each queue.

Also, the data receiving and storing apparatus may comprise:
- a plurality of data receiving and storing elements each comprising a receiving/accessing means and a storing means, and
- a controlling unit comprising the means for determining the address at which to store at least part of the data packet, wherein the determining step comprises:
- each of the data receiving and storing elements forwarding information relating to the received data packet to the controlling unit,
- the determining means of the controlling unit determining the address also on the basis of the forwarded information and
- the determining means returning the address to the pertaining receiving/storing element.

In a preferred embodiment, the reading/de-queuing step comprises a plurality of processors or processes, each processor/process reading/de-queuing data from a first group of the queues, the queues of the individual first groups being non-overlapping, and wherein the determining step comprises determining the address by:
- for a received/accessed data packet, determining a second group of queues, each second group of queues comprising one queue from each first group of queues, the queues of the second groups being non-overlapping,
- if the fill level of a presently selected, first queue of the determined second group exceeds a predetermined level, identifying and selecting a second queue of the determined second group,
- selecting the address as an address of the identified, second queue, the method further comprising the step of instructing the process/processor relating to the identified and selected second queue to not process this queue, until the first queue with the exceeded predetermined level is empty.

In FIG. 1, an embodiment 10 of an apparatus for analyzing and forwarding data frames is illustrated having a number of adapters 12 each connected to and receiving data from a network, such as the WWW.

In general, a system of this type may be used for receiving a large number of data packets and facilitate storage and/or forwarding thereof in a suitable manner. These data packets usually are transmitted between pairs of computers or networks on a data connection monitored by the present system. Thus, the data packets normally are not meant for nor addressed to or from the present system.

This data may, when stored, be processed by one or more subsequent processes or processors (not illustrated). In order to be able to handle very large amounts of data, structured storing is desired in order to achieve swift, yet structured, retrieval of the data. Also, a plurality of processors is provided when a single processor does not suffice, whereby separate storing of data for each processor is desired.

The processors may be used for analyzing the data traffic, for storing the data and/or for transmitting the data to other network elements, computers or the like, depending on the result of the processing in the processors.

Alternatively, or additionally, it may be desired to subsequently output the data again, whereby it may also or alternatively be desired to store the data in a manner or sequence in which the outputting is desired.

Normally, the data packets are parts of streams of data packets. When two processors or computers interact, a stream of data packets is exchanged. This stream may be a file transfer or an exchange of audio/video, such as Voice over IP. A stream is a sequence of data packets which are similar, and the belonging of a data packet to a stream is determinable, and it is desired that all data packets of a stream are stored together, in the desired order, handled by the same subsequent process or processor and/or output in that order.

The belonging of a received data frame to a stream is determined from an analysis of the frame. This analysis is described in further detail below.

The present embodiment aims at providing a set-up in which multiple adapters 12 divide the task of analyzing the frames/packages and/or storing these.

More particularly, the adapters 12 receive data frames from the network 14, such as the WWW, a trunk or network of any suitable type. Each adapter 12 receives a number of frames independently of the other adapters 12.

Preferably, all adapters, potentially except one, are identical and each comprises a so-called PHY 20, which is an element adapted to receive data frames from a network or data cable and a so-called MAC circuit 22 which converts the received frames to a standard usually used on data busses on e.g. computers.

Having received the data frame, it is provided with a time stamp in the circuit 24, where after the frame is fed to an analyzing circuit 26 which derives data relating to the data frame, such as relating to a standard the frame conforms to, such as whether it is VLAN and/or MPLS tagged, and potentially address data therefrom. A plurality of different types of standards are known, each of which defines which types of data (address, encapsulation, payload, error correction etc) are present in the frame and where such data is present. Depending on the particular type of packet, different types of data may be derived.

The circuit 26 outputs data identifying the data frame, such as its belonging to a data packet stream, or a queue in a central storage. Then, the length of the data frame, the ID/queue identification and the time stamp of the data frame is transmitted, in a request circuit 28, to a central server memory allocator or controller 16, which returns an address within the storage 18 in which the data frame is to be stored. This address is returned to a transfer circuit 30 also receiving the data frame and which subsequently transmits the data frame to the identified address via a common data bus 32, such as running a PCI Express (PCIe) protocol. This storing may be using Direct Memory Addressing, which means that the frame is stored directly at the desired address, and that no further analysis is required. This is the fastest manner of storing data in a data storage, but it requires that the physical address is known.

Naturally, the circuit 28 may alternatively output, together with or without the time stamp and length of the packet, other information identifying the frame (type, addresses or the like), whereby the allocator itself will determine the queue to which the frame is to be added and thus derive the address at which the frame is to be stored.

The "out of band" communication between the allocator 16 and the adapters 12 may be a low bandwidth point-to-point communication, a daisy chain topology, or a ring topology. This communication, as is described further below, is also used for synchronizing the clocks of the time stamp circuits 24. A suitable protocol for this communication may be a standard 64 b/66 b codec requiring approximately 1 Gbps full duplex bandwidth per 10 Gbps of Ethernet front port (PHY) bandwidth.

It is noted that the above embodiment 10 may store the data frames in any number of queues in the storage 18. Which queue to forward a data packet to may depend on the future destiny of the frame. If the frame is to be analyzed by one or more processors, one queue may be provided for each processor, and the forwarding of frames to a queue may depend on how long the queue is before adding the packet. If the queue is long, and the processor thus busy, the packet may be provided in a shorter queue of a processor thus less busy.

It is noted that if most data frames relate to streams, it may not be desired to transmit frames relating to the same stream to different queues for analysis by different processors.

In this manner, any load balancing between processors is preferably carried out by allocating all future frames from a newly started stream to a "starving" processor. An alternative to this is described further below, as is this load balancing.

Also, if the frame is at a later point in time to be output from the storage 18, the frames to be output may be provided in a particular queue and in an order in which the frames are to be output. Such outputting is described further below.

If a given quality of service is desired, any queue may be split up into a number of queues of different priorities, so that higher priority frames may overtake lower priority frames and then be handled (processed, output, analyzed or the like) swifter.

Load Balancing within an Adapter 12

Figure 6:
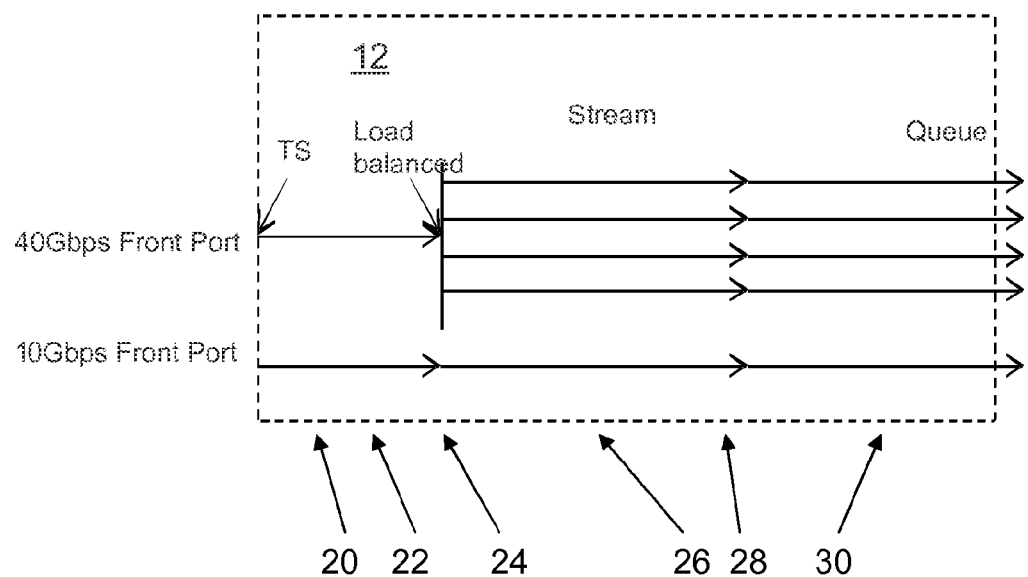
FIG. 6 illustrates load balancing within an adapter.

In FIG. 6, it is seen that part of the elements, such as the PHY 20, MAC 22 and Time Stamp allocation 24 of an adapter 12 may be working at a higher speed than that of the other elements, such as the analyzer 26, the requester 28 and the transfer circuit 30. In this situation, multiple "instantiations" of these slower elements may be made in order to divide the data packet flow received and time stamped from the elements 20-24 into multiple parallel flows. In FIG. 6, the data packets received on a single PHY 20 are divided into four parallel flows. The elements 20-30 are not directly illustrated, but their positions in the flow are.

Naturally, load balancing between the individual flows may be carried out if desired.

The lower line in FIG. 6 illustrates the alternative, where a high speed PHY 20 receives data packets which are handled in a single flow in the adapter 12.

Load Balancing of External Processes or Processors Using Multiple Queues

Load balancing of processors or processes (not illustrated) reading data from the queues of the storage 18 may be performed in a number of manners. If an ordering (order of receipt or defined by data in the individual data packets) of data packets in stream or the like is not relevant, a single queue may be provided for each processor. If the queue of one processor runs full (how this may be determined is described further below), the allocator 16 may simply effect that more data packets is transmitted to the other queue(s).

If quality of service is desired, different queues may be used for different priorities.

Figure 5:
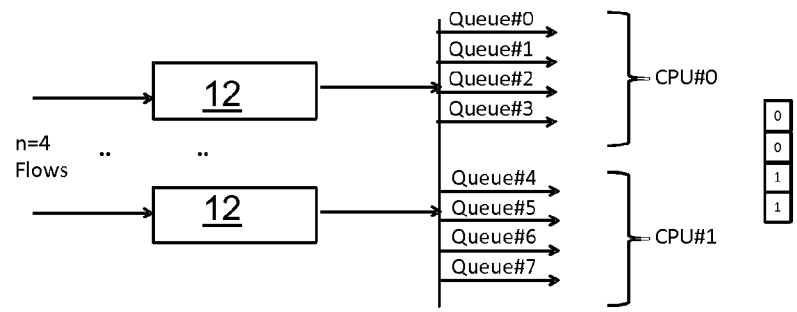
FIG. 5 illustrates load balancing between processors while maintaining order between the data packets.

If an ordering of the data packets of e.g. a stream is desired maintained, a scheme is illustrated in FIG. 5, wherein two adaptors 12 are illustrated receiving a total of 4 flows/streams of data.

The adaptors 12 transmit the data packets to a total of 8 queues (no. #0-#7) stored in the storage 18 for de-queuing by two processors (no. #0 and #1) using the following scheme: queues #0-#3 are handled by processor #0, and queues #4-#7 are handled by processor #1. Also, queues #0 and #4 are generally used for stream #0, queues #1 and #5 are used for stream #1 and so on.

Initially, data packets of stream #0 are transmitted to queue #0, but as this queue grows full, the allocator 16 starts transmitting data packets from stream #0 to queue #4. However, processor #1 is not allowed to de-queue and analyze such packets, until processor #0 has emptied queue #0. In order to control this, four bits are allocated, one for each stream, the value of which determines which processor may handle packets from each queue. In FIG. 5, the top bit controls the access to stream #0, and as its value is "0", this means that processor #0 may handle this queue and thus de-queue packets from queue #0.

It is seen that the two bottom bits are "1" indicating that processor #1 is allowed to handle streams #2 and #3 and thus de-queue from queues #6 and #7. When a processor is allowed to process more than a single queue, it may select the next queue to be processed in any suitable manner, such as round robin, priority, queue length, or the like.

The four bits are controlled by the processors and stored in the storage 18. When more than two processors are used, an ordering or sequence thereof is decided, so that when processor #1 has emptied a queue, either it will alter the corresponding bit(s), or processor #2 will notice that the queue of processor #1 is empty, alter the corresponding bit(s) and then start de-queuing its corresponding queue. The same order is used by the controller to determine to which queue, if one is full, to add the next data.

Then, in order to maintain the ordering of the data in the queues, the allocator 16, if changing a queue, will always select a new queue which is empty.

Naturally, if more than two processors are able to handle a single queue, more bits are used for each flow to indicate which processor is presently allowed to process the flow.

Virtual Address—Physical Address

In order to make the set-up more easily adapted to different systems, it is preferred that the request circuit 28, the transfer circuit 30, the allocator 16 as well as any de-queuing circuitry in or connected to the storage 18 operate in a virtual address space.

Due to the standard requirement that only a given maximum block size may be allocated for DMA, and the fact that such allocated blocks may be positioned at different or random positions in the memory in different systems or from time to time of operating the same apparatus, direct operation using the physical addresses becomes cumbersome. Hence, virtual addresses are preferred.

Presently, an address (see FIG. 2) with a total length of 32 bits is divided into two parts of which one part has a number of bits adapted to address all addresses in a maximum size allocatable block. In the present example, the max size block or segment has a size of 4 MB, requiring 22 bits for addressing. This part of the virtual and physical address is the same and is used for addressing within a single block/segment.

In order to avoid the fact that physical blocks/segments may be positioned at different addresses in the storage 18, the virtual addresses are all, at least for each queue, defined as consecutive addresses, irrespective of the fact that these may be positioned in different blocks/segments. Thus, the 32 bits will be interpreted as a number of consecutive addresses. This may be sub-divided into a number of 4 Mbyte blocks/segments, but virtually positioned consecutively. The virtual address may thus be seen as an initial 10-bit part indicating one of the consecutive virtual blocks/segments and the last 22 bits as an internal addressing within this block/segment.

In the physical reality in the storage 18, the last 22 bits addressing within a segment/block may be maintained, but the first 10-bit part of the virtual address is simply converted into an addressing or identification of one of the physically allocated blocks/segments.

For this use, a Look Up Table is provided for translating the first 10 bits of the virtual address to an actual identification—i.e. a 10-bit address—of an actually allocated block/segment.

Figure 2:
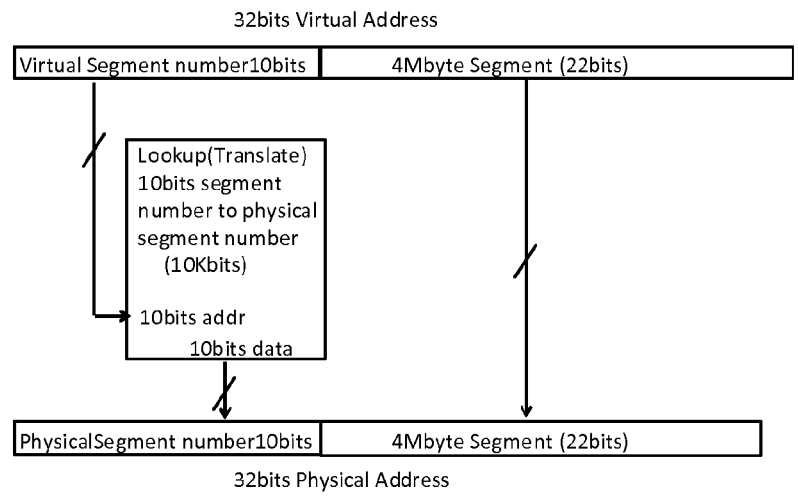
FIG. 2 illustrates conversion from virtual address to physical address.

This Look-Up Table (LUT) may be set up at initialization of the embodiment. This is illustrated in FIG. 2.

It is noted that also the read/write pointers, which are described below, may be used in the virtual address space, which again makes e.g. determination of a queue length much easier, when the virtual addresses are defined as sequential addresses.

Naturally, as will be seen further below, if a process/processor de-queues a data item from the storage 18, the address and size (or number of addressable elements taken up) thereof may be returned to the allocator 16 as the physical address or the virtual address. In either case, the allocator 16 is able to determine the virtual address and update the pointers accordingly.

Timing—Synchronization of Clock Between the Allocator 16 and the Adapters 12

In order to have reliable and comparable time stamps for the frames received, it is desired to have synchronized clocks in the adapters 12 and the allocator 16.

Figure 3:
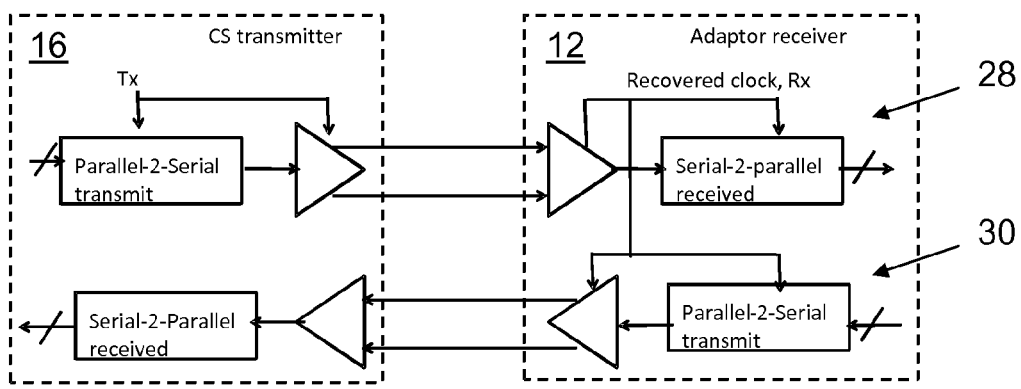
FIG. 3 illustrates synchronization of clocks between the allocator and an adapter of FIG. 1.

Clock phase synchronization is presently obtained by forwarding, with the data transferred from the allocator 16 to the transfer circuits 30, a clock signal which is encoded in the data transferred but recoverable as is usual in the art. The adapters 12 are adapted to derive this clock signal and use it both in the transfer circuit 30 and the request circuit 28, as illustrated in FIG. 3.

Having synchronized the phases, the actual clock time is synchronized in two steps. In step 1, the allocator 16 transmits to each adapter 12 an instruction to transmit a message to the allocator 16 which then determines the overall roundtrip time when receiving the message. In step 2, the allocator 16 instructs the adapter 12 to adapt its time to the clock time of the allocator 16.

More particularly, step 1 comprises the allocator 16 transmitting an instruction to the individual adapter 12 while logging the local allocator transmission time. The adapter 12, when receiving the instruction, immediately transmits a message to the allocator 16, which logs the time of receipt. The contents of the instruction and message are not important. The allocator 16 now subtracts the transmission time from the time of receipt and derives the roundtrip time. Half this time is assumed to be the time delay of a data transmission between the allocator 16 and the pertaining adapter 12. Naturally, different time delays may exist between the allocator 16 and different adapters 12.

Step 2 is the transmission from the allocator 16 to the adapter 12 of an instruction to set the local adapter time to a value being the present local time of the allocator 16 added the determined time delay. Thus, when the adapter 12 receives this instruction, it will set its local time to the time which the local time at the allocator 16 in the meantime has advanced to. Then, the clock times of the allocator 16 and the adapter 12 is synchronized to within a clock cycle of the clock signal. As the phases or clock pulses are also synchronized, the clocks will remain synchronized.

This recovered clock is then also used for time stamping the data packets received. Thus, all time stamps are synchronized to within a clock cycle.

As a number of instructions may be pending between the allocator 16 and any of the adapters 12, an identifier is provided in each instruction/request. Presently, the identifier is a time stamp between 0 and 7 (3 bits) which is shifted and wrapped around in synchronism with the clock. Thus, the allocator 16, when sending an instruction, will add the time stamp, and the adapter 12, when replying to that instruction, will copy the time stamp into the reply, so that the allocator 16 is able to determine to which instruction the reply relates.

Naturally, the present synchronization of the adapter 12 to the allocator 16 may be performed for any number of adapters 12. The adapters 12 may be connected to the allocator 16 in a star configuration in which all adapters 12 communicate directly with the allocator 16, in a ring topology, or in a daisy chain configuration having the allocator 16 at an end of a string of adapters 12 which then communicate with the allocator through one or more other adapters 12.

Operation of the Allocator 16

For each of the queues of the storage 18, the allocator 16 has two queues (see FIG. 4): a RIFO (Random In First Out) and a FIRO (First In Random Out) queue.

The FIRO queue holds the pending requests from all adapters 12 and relating to the pertaining queue of the storage 18. A Write pointer points to the next free position of the FIRO queue. A request received from an adapter 12 is received and provided in this position.

The RIFO queue holds information relating to when frames for the storage queue are to be output as well as an order thereof. Each entry in the RIFO queue relates to a point in time of the clock, and a read pointer points to the present point in time of the RIFO queue.

When a request is received, the time stamp thereof is derived, and an identifier is provided in the RIFO queue at the corresponding position or point in time. It is noted that this position or point in time may be sooner than other frames for the same storage queue due to the fact that information from some adapters 12 or the processing in such adapters 12 may take longer than from/in others.

Figure 4:
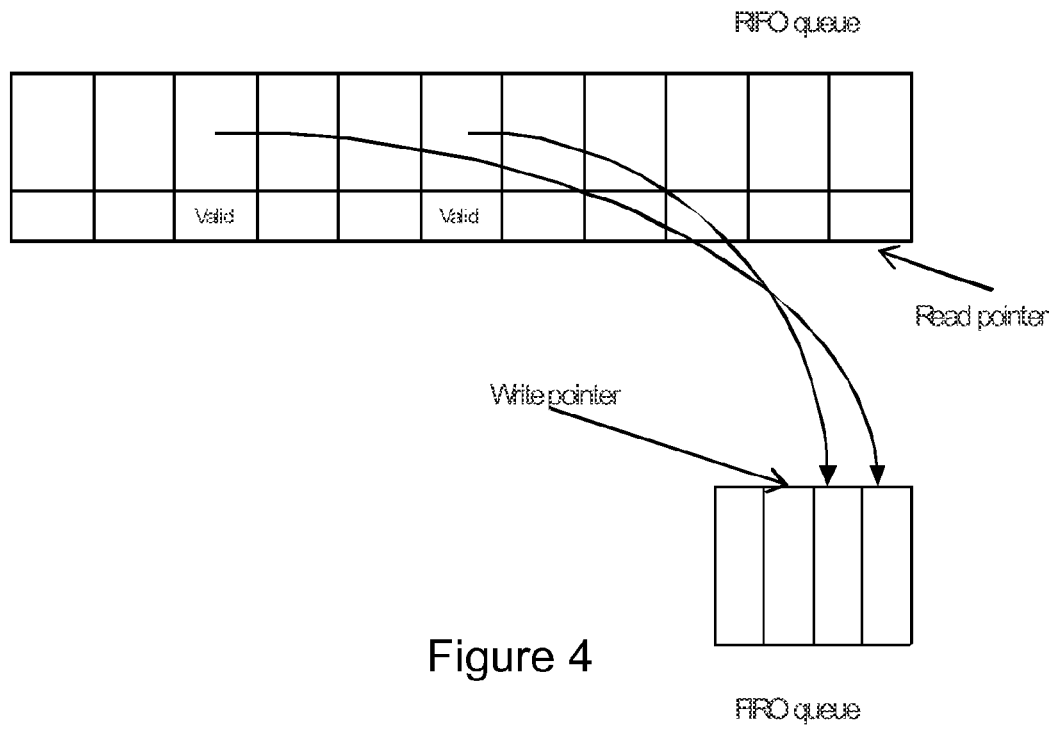
FIG. 4 illustrates a manner of ordering randomly received packets in a time sequence.

In FIG. 4, it is seen that the first frame in the FIRO queue has a later transmission time that the next frame.

The Read pointer of the RIFO queue advances once per clock cycle, and if an identifier is seen at the new position of the Read pointer, the corresponding position of the FIRO queue is addressed and a transmission instruction is transmitted to the pertaining adapter 12. Then, the corresponding entry of the FIRO queue is removed (or an end pointer is advanced to this position).

Naturally, the FIRO and RIFO queues may be implemented as circular queues.

In order to take into account any time delays caused by e.g. data transmission between the adapters 12 and the allocator 16 as well as processing times in the adapters 12, the Read pointer preferably relates to a point in time delayed in relation to the actual point in time as defined by the synchronized clocks and which is used for providing the time stamps of the frames (as is also forwarded in the requests stored in the FIRO). In this regard, when the entry is provided at the correct position in the RIFO queue, the time stamp of the relevant request is no longer needed and is discarded in order to not take up space in the tables.

Thus, the time of the Read pointer may be several, such as 3, 4, 5, 6, 7, 8, 9, 10 or more clock cycles behind the real clock. Then, a frame time stamped at e.g. time 120 may be forwarded to the FIRO queue and entered into the RIFO queue at time 120, which is addressed (Read pointer advanced to that position) at time 130.

At all times and for each queue in the storage 18, the allocator 16 has two pointers, a Write pointer identifying the next address at which a next frame from an adapter 12 is to be stored, and a Read pointer identifying the address of the next stored frame of this queue to be de-queued for further analysis, forwarding or the like. When a new frame is to be stored, the Write address is forwarded, i.e. the next virtual address is converted into its physical address which is forwarded, to the pertaining transfer circuit 30, which then facilitates storing of the frame. At the same time, the allocator 16 increases the pertaining Write pointer with a value corresponding to the size of the frame.

In the situation where one or more of the queues hold frames for further analysis of e.g. a processor, the number of frames in such a queue, or the fill level of the queue, will illustrate how busy this processor is. This is simply determined by the difference in addresses between the Write pointer and the Read pointer of the queue, when virtual addresses are used.

The de-queuing of frames from the storage 18 may be facilitated by any apparatus or process/processor, such as one connected to the storage. De-queuing a frame from the storage 18 causes this apparatus/process/processor to alter the Read pointer of this queue correspondingly.

In general, adding frames to the storage 18 makes the allocator 16 alter the write pointers, and de-queuing frames makes the processes/processors alter the read pointers. Naturally, it is desired that this information is exchanged. Several methods and schemes exist.

In one situation, it is desired to not exchange this data too often in order to preserve bandwidth on the DMA bus for the data packet exchange. In this situation, the mirroring or synchronizing is initiated by the allocator 16. Each time a data packet is written in the storage 18, the allocator 16 may update the write pointer, whereby the (number of data frames or the fill level of) individual queues will seem, to the allocator 16, to grow, as the read pointers are not updated.

Naturally, updated write pointers may be exchanged once in a while, but this is preferred to not update these, until a size of a queue exceeds a predetermined limit. At this point, the allocator 16 will update the read pointers from the storage 18 or the process(es)/processor(s) in order to obtain updated data on the actual sizes of the queues and thus of how busy the process(es)/processor(s) is/are.

In one situation, the process(es)/processor(s) may, at the same time, receive updated write pointers. In this manner, the process(es)/processor(s) may starve, if they empty all queues before information that additional packets have been stored and are ready for analysis/de-queuing. This may be avoided by updating the write pointers at the processes/processors or in the storage 18, when updating them in the allocator 18. Then, the processes/processors have updated queue information and keep operating, as long as data packets are present.

Alternatively, the updating also of the read pointers may be more frequent, in order to keep the allocator 16 and the process(es)/processor(s) better "informed". This synchronization of the Write/Read pointers could be performed when the bus 32 is not busy, or e.g. when a maximum delay has passed since the last synchronization.

Naturally, the queues or storage 18 may be circular, and a particular space may be allocated to a queue if desired.

Naturally, if an adapter 12 back to back receives multiple data frames which relate to the same stream, the request circuit 28 will transmit a number of requests which the allocator 16 then will provide at the relevant positions in the RIFO queue. If the relevant adapter 12 is identified in each entry in the RIFO queue, the allocator 16 may identify multiple, neighboring entries in the RIFO which relate to the same adapter 12, and thus only revert to this adapters 12 transfer circuit 30 with one transmission identifying not only the queue (address data) but also the number of packets to be forwarded on the basis of this simple request.

Transmission of Data from the Storage 18 Via an Adapter 12

Naturally, data packets stored in one or more queues in the storage 18 may be de-queued, transmitted over the bus 32 and output via an adapter 12. As is the case when storing the data packets stored in the storage 18, this may be performed via DMA, whereby the adapter 12 directly reads the data packets in the storage 18 without intervention from e.g. a processor at the storage 18.

The scheme of de-queuing packets is as that described above for storing packets in the storage 18:

Data packets from a number of queues in the storage 18 may be output via the same adapter 12. These may be arbitrated using any desired scheme, such as round robin, priority or any other prioritization. In the adapter 12, any number of Tx ports or FIFOs may be provided for different flows, queues, priorities or the like, and packets from these may be output via a single PHY or via different PHYs.

In one situation, read/write pointers of a queue are stored in the storage 18 as is the case when storing data in the storage 18. In the same manner, the adapter 12 may mirror the read/write pointers and keep de-queuing data from the queue as long as data seems to be present. Mirroring may, as described above, take place at fixed maximum time intervals, when a queue seems to be too full or too empty, or the like.

The processes/processor may keep track of the Read and Write pointers and, as described above, determine whether the adapter 12 is so busy that data packets for the pertaining queue(s) should be forwarded to another queue and another adapter 12.

In another situation, a processor or process may define which data packets or addresses should be output via an adapter 12 and may forward an indication of such addresses to the adapter 12.

One manner is for the process or processor to copy such packets into a particular queue de-queued by the adapter using a particular set of read/write pointers updated by the process/processor and which is mirrored on to the adapter 12.

Another manner focuses on not copying data packets. In this situation, the data packets are maintained in the original queue, but another set of read/write pointers may be provided for use with the de-queuing of data packets. In fact, a single additional pointer is required, if the original read/write pointers of the queue are maintained. The additional pointer indicates where, in the queue, the process/processor has come to in the analysis and, thus, which of the addresses between the read and write pointer may be de-queued. This additional pointer is maintained by the processor/process and forwarded to or read by the adapter using e.g. DMA, and the pertaining adapter informs the processor/process or the controlling circuit 16, when an address has been de-queued.

The invention claimed is:

1. An assembly for receiving and forwarding data packets, the assembly comprising:
    a storage comprising a plurality of addresses at which data may be stored,
    a data receiving and storing apparatus comprising a first processor configured to:
        receive or access a data packet,
        determine an address, and
        facilitating storage of at least part of the data packet at the determined address in the storage, and
    one or more second processors configured to read or de-queue data from the storage, the one or more second processors being configured to output first information relating to one or more address(es) of the storage, the data of which has been read/de-queued,
wherein the first processor is configured to:
    derive, on the basis of the address(es) determined, information relating to a fill level of one or more groups of addresses of the storage, instruct, when the fill level exceeds a predetermined level, the one or more second processors to output the first information and re-derive the fill level information also on the basis of the first information.

2. The assembly according to claim 1, wherein the first processor is configured to output second information relating to the determined address, the one or more second processors being configured to read/de-queue data on the basis of the second information.

3. The assembly according to claim 1, wherein each of the one or more groups of addresses defines one of a number of queues defined in the storage, each queue being defined by a plurality of sequential addresses, all addresses of the queues being non-overlapping, and wherein the first processor is configured to derive the fill level of the queues.

4. The assembly according to claim 3, wherein the first processor is configured to hold, for each queue, a write pointer identifying a next address in which to add data and a read pointer identifying a next address to be read/de-queued from the queue,
the first processor being configured to update the write pointer of the queue to which the determined address relates, when an address is determined,
the first processor being configured to update, on the basis of the first information, the read pointer of the queue from which data has been de-queued,
wherein the first processor is configured to determine the fill level of a queue on the basis of the read and writer pointers of the queue(s).

5. The assembly according to claim 1, wherein the data receiving and storing apparatus comprises:
a plurality of data receiving and storing elements each comprising a third processor configured to receive or access a data packet and a storage, and
a controlling unit comprising a fourth processor configured to determine an address at which to store at least part of the data packet,
wherein:
each of the data receiving and storing elements further comprises a fifth processor configured to forward information relating to the received data packet to the controlling unit,
the fourth processor of the controlling unit is configured to determine the address also on the basis of the forwarded information and
the fourth processor is configured to return the address to the pertaining receiving/storing element.

6. The assembly according to claim 3, wherein the one or more second processors comprise a plurality of processors or processes, each processor or process being configured to de-queue data from a first group of the queues, the queues of the individual first groups being non-overlapping, and wherein the first processor is configured to select the address by:
for a received/accessed data packet, determine a second group of queues, each second group of queues comprising one queue from each first group of queues, the queues of the second groups of queues being non-overlapping,
if the fill level of a presently selected first queue of the determined second group exceeds a predetermined level, identifying and selecting a second queue of the determined second group,
selecting the address as an address of the identified, second queue,
the assembly further comprising a sixth processor configured to instruct the process/processor relating to the identified and selected second queue to not process this queue, until the first queue with the exceeded predetermined level is empty.

7. A data receiving and storing apparatus for use in an assembly, comprising:
the data receiving and storing apparatus as well as
a storage comprising a plurality of addresses at which data may be stored, and one or more second processors configured to read or de-queue data from the storage, the one or more second processors being configured to output first information relating to one or more address(es) of the storage, the data of which has been read/de-queued,
wherein the data and storing apparatus comprises a first processor configured to:
receiving or accessing a data packet,
determining an address, and
facilitating, storage of the at least part of the data packet at the determined address in the storage, and
deriving, on the basis of the address(es) determined, information relating to a fill level of one or more groups of addresses of the storage,
instructing, when the fill level exceeds a predetermined level, the reading/de-queuing step to output the first information and re-derive the fill level information also on the basis of the first information.

8. A method of operating an assembly, the method comprising:
storing data in a plurality of addresses in a storage, the storage comprising a plurality of addresses at which data may be stored,
the data receiving and storing apparatus:
receiving or accessing a data packet,
determining an address, and
facilitating storage of the at least part of the data packet at the determined address in the storage, and
reading or de-queuing data from the storage, the reading/de-queuing step comprising outputting first information relating to one or more address(es), the data of which has been read/de-queued,
a determining step comprising:
deriving, on the basis of the address(es) determined, information relating to a fill level of one or more groups of addresses of the storage,
instructing, if the fill level exceeds a predetermined level, the reading/de-queuing step to output the first information and re-derive the fill level information also on the basis of the first information.

9. The method according to claim 8, wherein the determining step comprises outputting second information relating to the determined address, the reading/de-queuing step comprising reading/de-queuing data on the basis of the second information.

10. The method according to claim 8, wherein each of the one or more groups of addresses defines one of a number of queues defined in the storing means, each queue being defined by a plurality of sequential addresses, all addresses of the queues being non-overlapping, and wherein the determining step comprises deriving the fill level of the queues.

11. The method according to claim 10, wherein the determining step comprises determining, for each queue, a write pointer identifying a next address in which to add data and a read pointer identifying a next address to be read/de-queued from the queue, the determining step comprising updating the write pointer of the queue to which the determined address relates, when an address is determined,
the determining step comprising updating, on the basis of the first information, the read pointer of the queue from which data has been de-queued, wherein the determining comprises determining the fill level of a queue on the basis of the read and writer pointers of the queue(s).

12. The method according to claim 8, wherein the data receiving and storing apparatus comprises:
- a plurality of data receiving and storing elements each comprising a receiving/accessing means and a storing means, and
- a controlling unit comprising the means for determining the address at which to store at least part of the data packet, wherein the determining step comprises:
- each of the data receiving and storing elements forwarding information relating to the received data packet to the controlling unit,
- the determining means of the controlling unit determining the address also on the basis of the forwarded information and
- the determining means returning the address to the pertaining receiving/storing element.

13. The method according to claim 10, wherein the reading/de-queuing step comprises a plurality of processors or processes, each processor/process reading/de-queuing data from a first group of the queues, the queues of the individual first groups being non-overlapping, and wherein the determining step comprises determining the address by:
- for a received/accessed data packet, determining a second group of queues, each second group of queues comprising one queue from each first group of queues, the queues of the second groups being non-overlapping,
- if the fill level of a presently selected, first queue of the determined second group exceeds a predetermined level, identifying and selecting a second queue of the determined second group,
- selecting the address as an address of the identified, second queue, the method further comprising the step of instructing the process/processor relating to the identified and selected second queue to not process this queue, until the first queue with the exceeded predetermined level is empty.

* * * * *